(12) United States Patent
Griffin

(10) Patent No.: US 8,421,641 B2
(45) Date of Patent: Apr. 16, 2013

(54) OBJECT DETECTION SYSTEM AND METHOD USING SUB-SAMPLING

(75) Inventor: Dennis P. Griffin, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 391 days.

(21) Appl. No.: 12/752,187

(22) Filed: Apr. 1, 2010

(65) Prior Publication Data

US 2011/0241895 A1 Oct. 6, 2011

(51) Int. Cl.
G08B 21/00 (2006.01)

(52) U.S. Cl.
USPC ......... 340/686.1; 701/45; 381/71.4; 324/661; 324/681; 340/665; 340/666; 340/667; 340/438

(58) Field of Classification Search ............... 340/573.6, 340/686.1, 665, 666, 667, 438; 701/45; 381/71.4; 324/681

See application file for complete search history.

(56) References Cited

U.S. PATENT DOCUMENTS

| | | | |
|---|---|---|---|
| 3,469,204 A * | 9/1969 | Zollinger et al. | 331/65 |
| 7,146,024 B2 * | 12/2006 | Benkley, III | 382/107 |
| 7,876,106 B2 * | 1/2011 | Hansen et al. | 324/681 |
| 2008/0191714 A1 * | 8/2008 | Masuda et al. | 324/661 |
| 2011/0115500 A1 * | 5/2011 | Stanley et al. | 324/661 |

* cited by examiner

Primary Examiner — George Bugg
Assistant Examiner — Anthony D Afrifa-Kyei
(74) Attorney, Agent, or Firm — Lawrence D. Hazelton

(57) ABSTRACT

An object detection system, controller, and method using sub-sampling for detecting a presence of an object at the location. An electrode arranged near the location radiates an electric field that corresponds to an electrode signal that arises in response to an excitation signal. When the excitation signal is coupled to the electrode and the electric field is radiated, the electrode exhibits an electrode impedance indicative of the presence of an object. The presence of an object is detected by analyzing the electrode signal using sub-sampling. Traditionally, such electrode signals have frequencies, high enough to warrant the use of expensive high-frequency signal processing devices. Sub-sampling is a way of sampling and processing the electrode signal such that the signal processing to detect the object can be performed by a lower cost general purpose microprocessor.

23 Claims, 5 Drawing Sheets

OBJECT DETECTION SYSTEM AND METHOD USING SUB-SAMPLING

TECHNICAL FIELD OF INVENTION

The invention generally relates to object detection systems and methods that use sub-sampling to determine the presence of an object at a location. More particularly, but not exclusively, the invention relates to detecting the presence of an occupant in a vehicle.

BACKGROUND OF INVENTION

It is known to selectively enable or disable a vehicle air bag or other occupant protection device based on the presence of an occupant in a seat. It has been proposed to place electrically conductive material in a vehicle seat to serve as an electrode for detecting the presence of an occupant in the seat. For example, U.S. Patent Application Publication No. 2009/0267622 A1, which is hereby incorporated herein by reference, describes a vehicle occupant detection system that determines the presence of an occupant based on the electrode's electrical characteristics. The electrical characteristics may be determined by coupling an excitation signal to the electrode to generate an electrode signal, and processing the electrode signal to determine an electrode signal magnitude that is indicative of an occupancy state.

The frequencies of excitation signals suggested for such occupant detection range from 1 kHz to 100 kHz, and higher. A sampling rate of ten or more times the excitation frequency is typically suggested to reliably detect the magnitude of such electrode signals. It will be appreciated that an analog-to-digital converter capable of sampling such electrode signals at the sample rates suggested are undesirably expensive, particularly when considered for use in a vehicle such as an automobile.

SUMMARY OF THE INVENTION

In accordance with one embodiment of this invention, an object detection system using sub-sampling is provided. The system includes an electrode, a reference impedance device, a signal generator, and a sample and hold means. The electrode is arranged proximate to a location to sense a presence of an object at the location. The electrode exhibits an electrode impedance indicative of the presence of an object. The reference impedance device is coupled to the electrode to form a detection network. The signal generator comprises an excitation signal output coupled to the detection network. The excitation signal output is configured to output an excitation signal having an excitation frequency to generate an electrode signal on the detection network having an electrode signal magnitude indicative of the presence of an object. The sample and hold means is configured to sub-sample the electrode signal at a sampling frequency and generate a sub-sampled electrode signal having a sub-sampled electrode signal magnitude indicative of the electrode signal magnitude. As such, an occupancy state is determined based on the sub-sampled electrode signal magnitude.

In accordance with another embodiment of the present invention, a controller for use in a vehicle occupant detection system using sub-sampling is provided. The system has an electrode coupled to the controller, wherein the electrode is arranged proximate to an expected location of an occupant for sensing an occupancy state proximate thereto and exhibiting an electrode impedance indicative of an occupancy state. The controller includes a reference impedance device, a signal generator, and a sample and hold means. The reference impedance device is coupled to the electrode to form a detection network. The signal generator comprises an excitation signal output that is coupled to the detection network. The excitation signal output is configured to output an excitation signal having an excitation frequency to generate an electrode signal on the detection network having an electrode signal magnitude indicative of the occupancy state. The sample and hold means is configured to sample the electrode signal at a sampling frequency and generate a sub-sampled electrode signal having a sub-sampled electrode signal magnitude indicative of the electrode signal magnitude. As such, the occupancy state is detected based on the sub-sampled electrode signal magnitude.

In yet another embodiment of the present invention, a method for detecting an object at a location using sub-sampling is provided. The method includes the step of arranging an electrode proximate to the location to sense a presence of an object at the location. The electrode exhibits an electrode impedance indicative of the presence of an object. The method includes the step of outputting an excitation signal that is coupled to the electrode. The excitation signal has an excitation frequency that is selected based on the electrode impedance. The method includes the step of generating an electrode signal in response to the excitation signal. The electrode signal has an electrode signal magnitude indicative of the presence of an object. The method includes the step of sub-sampling the electrode signal at a sampling frequency. The sampling frequency is selected based on the excitation frequency. The method includes the step of generating a sub-sampled electrode signal having a sub-sampled electrode signal magnitude indicative of the presence of an object. The method includes the step of determining an occupancy state based on the sub-sampled electrode signal magnitude indicating that an object is present at the location.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Described herein are an object detection system, controller, and method for detecting a presence of an object at a location. An electrode arranged near the location may radiate an electric field from the electrode in response to an electrode signal. While not subscribing to any particular theory, it has been observed that when the electrode radiates an electric field, the electrode exhibits an electrode impedance that may be indicative of an object being impinged by the electric field. As used herein, the electrode exhibiting an electrode impedance means that the electrical connection to the electrode may be measured or characterized in terms of electrical impedance by coupling the electrode to an appropriate electrical network or an impedance measuring device. The electrode signal arises in response to an excitation signal being coupled to the electrode through a reference impedance device. The impedance of the reference impedance device and the electrode impedance cooperate such that variation of the electrode signal corresponds to the electrode impedance being exhibited and may be indicative of the presence of an object. The presence of an object may be detected by analyzing the electrode signal using sub-sampling. Traditionally, such electrode signals have frequencies, high enough to warrant the use of expensive high-frequency signal processing devices. Sub-sampling is a way of sampling and processing the electrode signal such that the signal processing can be performed by a lower cost general purpose microprocessor. Sub-sampling may even include sampling the electrode signal at a sampling frequency that is less than the fundamental. Such an object detection system may be useful for detecting an object such as a package on a conveyor belt in a shipping facility, an object such as a vehicle in a car wash, or an object such as a person occupying a doorway or an elevator.

Figure 1:
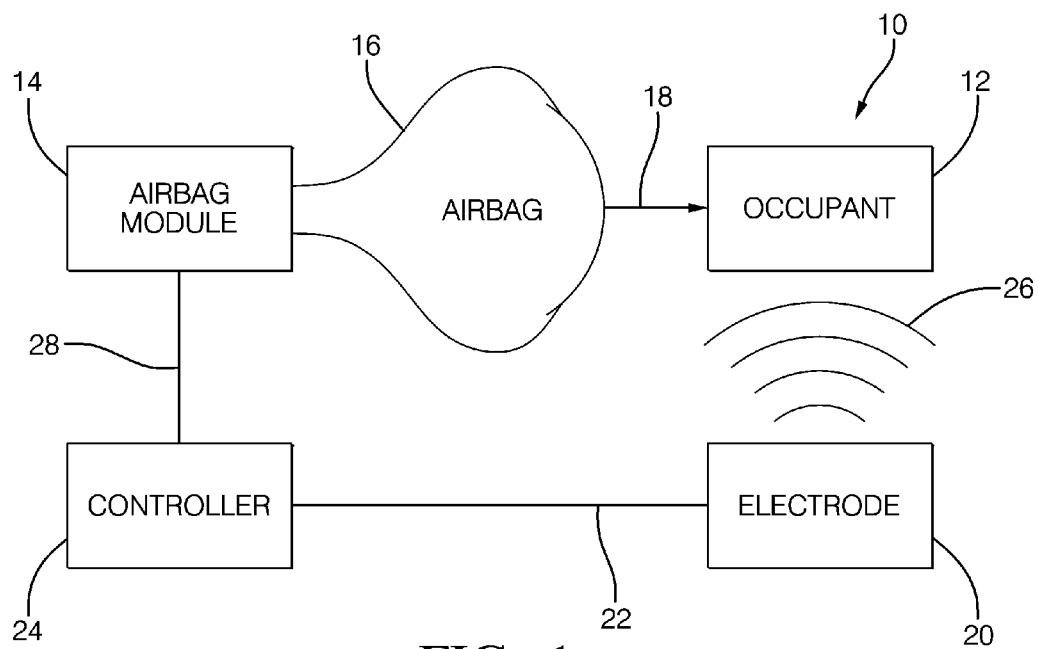
FIG. 1 block diagram of an occupant detection system, according to one embodiment.
Figure 2:
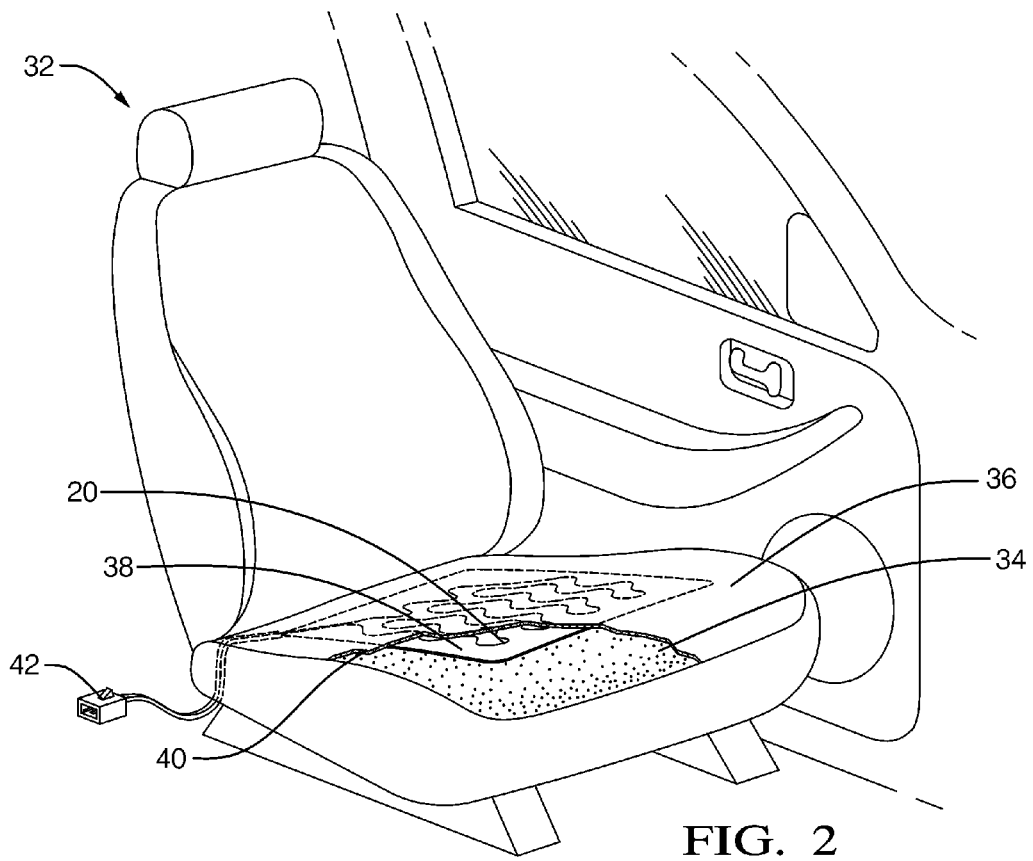
FIG. 2 is a perspective view of a seat assembly incorporating the occupant detection system shown in FIG. 1.
Figure 3:
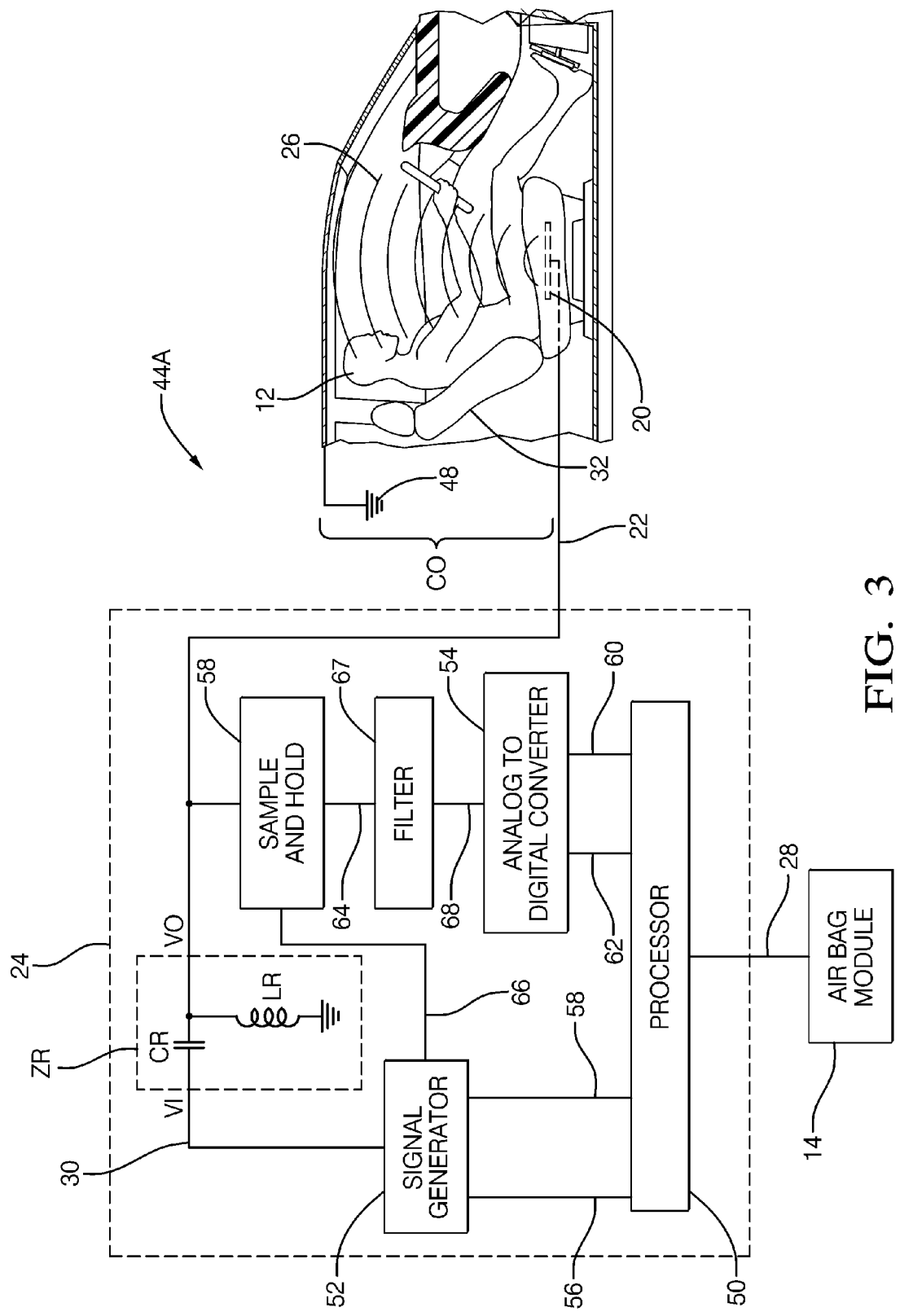
FIG. 3 is a block/circuit diagram illustrating an embodiment the occupant detection system shown in FIG. 1.

In accordance with an embodiment of an object detection system, FIG. 1 illustrates an occupant detection system 10 useful for determining the presence of an occupant 12 seated in a vehicle seat assembly 32, such as the embodiments illustrated in FIGS. 2 and 3. The occupant 12 may be an adult or an infant in a child seat. The occupant detection system 10 may include an air bag module 14 that receives an activation signal 28 based on the determined occupancy state, and deploys an air bag 16 as indicated by an arrow 18 to restrain or protect the occupant 12 in the event of a vehicle collision. Determining an occupancy state in the vehicle seat assembly 32 may include characterizing the occupant (e.g., adult versus infant) which may be useful for enabling or disabling the air bag module 14 or other passenger protection device in the vehicle. It is advantageous to disable the air bag module 14 if the vehicle seat is empty or occupied by an infant in a child seat so the air bag 16 is not unnecessarily deployed. The air bag module 14 may receive an activation signal 28 from a controller 24 to arm the air bag module 14 so that a signal from a collision detection system (not shown) can deploy the air bag 16. It should be appreciated that the occupant detection system 10 may be used for other vehicle functions such as activating a seat belt warning if the seat belt is not properly deployed.

The occupant detection system 10 includes an electrode 20 arranged proximate to or adjacent to an expected location of the occupant 12 for sensing an occupancy state proximate thereto. FIGS. 2 and 3 illustrate exemplary, non-limiting embodiments of an electrode 20 arranged in the vehicle seat assembly 32 suitable for use by the occupant detection system 10. The seat assembly 32 is illustrated as being in a vehicle passenger compartment according to one embodiment, but could be used in any kind of vehicle, such as an airplane. In FIG. 2, the seat assembly 32 has a seat cushion 34 for providing a seating surface 36 to support the occupant 12. Seat cushion 34 may be suitably made of foam having characteristics suitable for seating use. Adjacent the seating surface 36 is an exemplary embodiment of the electrode 20 in the form of a wire coupled to a mat 38 that simplifies arranging the electrode 20 in seat assembly 32. The electrode 20 can be made of a variety of electrically conductive materials suitable for use adjacent the seating surface 36. Exemplary materials for forming the electrode 20 include metal wire, conductive fiber, conductive ink, metal foil, and metal ribbon. The cushion 34 is covered with covering 40 to protect the cushion 34 and the electrode 20, and to make the appearance of seat assembly 30 attractive. The electrode 20 may be arranged to be located adjacent or proximate to the seating surface 36 of a vehicle seat to sense the occupant seated in the vehicle seat. The electrode 20 may be coupled to the controller 24 by a connector 42 so electrode 20 can be readily connected to the controller 24.

FIG. 3 illustrates an exemplary embodiment of a circuit diagram 44A useful for describing the operation of the occupant detection system 10. While not subscribing to any particular theory, it has been observed that the electrode 20 may exhibit an electrical characteristic similar to a capacitor, and that the capacitance value of this capacitor varies correspondingly with the presence or absence of an occupant 12 on or near the seat assembly 32. For example, U.S. patent application Ser. No. 12/700,243 filed Feb. 4, 2010, which is hereby incorporated herein by reference, describes a vehicle occupant detector system that determines the presence of an occupant based on the capacitive characteristic exhibited by an electrode. It has been suggested that for the purpose of explanation, the electrode 20 may be comparable to one plate of a capacitor CO connected to the electrode signal 22. The other plate of capacitor CO may then correspond to the frame and body of the vehicle surrounding the occupant 12 and may be suitably shown as being connected to a reference ground 48. It follows that the dielectric material between the plates of capacitor CO corresponds at least in part to the occupant 12. The dielectric constant of the dielectric material influences the coupling of an electric field 26 between the plates and thereby influences the capacitance value of the capacitor CO.

It has been observed that when the seat is empty, the capacitance value of the capacitor CO is lower than the capacitance value when the seat is occupied. The presence of a large adult versus a small child, or the absence of an occupant may vary the dielectric constant of the dielectric material between the plates and thereby vary the capacitance value of capacitor CO. A typical capacitance value for the exemplary empty seat assembly 32 illustrated in FIG. 2 is about 100 pF. When an adult occupies the seat assembly 32, the capacitive term may increases as much as 900 pF.

FIG. 3 further illustrates an embodiment of a controller 24. Features and function described herein as being part of the controller 24 are understood to also be part of the system 10, and are not required to be part of a single controller assembly as may be implied by the dotted line indicating the boundary of the controller 24. The controller 24 may include a reference impedance device ZR. In this embodiment, the reference impedance device ZR is interposed between the electrode 20 and a signal generator 52. The reference impedance device ZR has a first terminal VO coupled to the electrode 20 and a second terminal VI coupled to the signal generator 52. In one embodiment of the reference impedance device ZR the impedance value of the reference impedance device ZR is predominately determined by a reference capacitor CR. This arrangement forms a detection network that exhibits a voltage division ratio when generating the electrode signal 22, whereby the magnitude of the electrode signal 22 is dependent on the impedance value of the reference device ZR, in this embodiment the capacitance value of the reference capacitor CR, and the capacitance value of capacitor CO and so is indicative of the occupancy state. In another embodiment the impedance value of the reference impedance device ZR is determined by the reference capacitor CR connected as shown, plus a reference inductor LR connected between the first terminal VO and a reference voltage, such as ground as illustrated. This arrangement may form a detection network that exhibits a frequency response characteristic or voltage division characteristic having a resonant frequency indicative of the occupancy state.

The signal generator 52 may have an excitation signal output coupled to the detection network that may be configured to output an excitation signal 30 to the second terminal VI to generate an electrode signal 22 on the first terminal VO in response to the excitation signal 30. The signal generator 52 in one embodiment receives a generator control signal 56 from a processor 50 to generate an excitation signal 30 characterized as having an excitation magnitude at an excitation frequency. The signal generator 52 may be a digital device such as a digital signal synthesizer or may be an analog device such as voltage controlled oscillator. It is advantageous for the signal generator to be able to vary the excitation signal frequency and excitation signal magnitude to optimize the excitation signal for detecting an occupancy state.

In one embodiment, the excitation signal 30 may be in the form of a sinusoidal waveform. A sinusoidal waveform is advantageous because the value of the excitation magnitude and the electrode magnitude are readily correlated with the capacitance value of the capacitor CO and so may be readily used to indicate the occupancy state. As such, the detection network characteristics may be determined by measuring an electrode magnitude corresponding to the magnitude of an electrode signal 22 generated in response to an excitation signal 30 output by the signal generator 52.

The controller 24 may include a sample and hold means 58 configured to sample the electrode signal 22 at a sampling frequency and generate a sub-sampled electrode signal 64. The sample and hold means may be provided by a stand-alone integrated circuit such as a National Semiconductor LF198, or may be an analog switch such as a National Semiconductor 74HC4066 CMOS analog switch arranged to couple and decouple the electrode signal 22 to a storage capacitor. It should be appreciated that the specific sample and hold means 58 would be selected based on several factors including, but not limited to, system accuracy requirements, excitation signal frequency, sampling frequency, and cost considerations.

In one embodiment, the signal generator 20 may include a sampling signal output configured to output a sampling signal 66 to the sample and hold means 58 and thereby determine the sampling frequency of the sample and hold means 58. It may be advantageous for the signal generator to control both the excitation signal 30 and the sampling signal 66 so as to control the frequency content of the sub-sampled electrode signal 64 as it is based on the excitation signal frequency and the sampling frequency.

Figure 4:
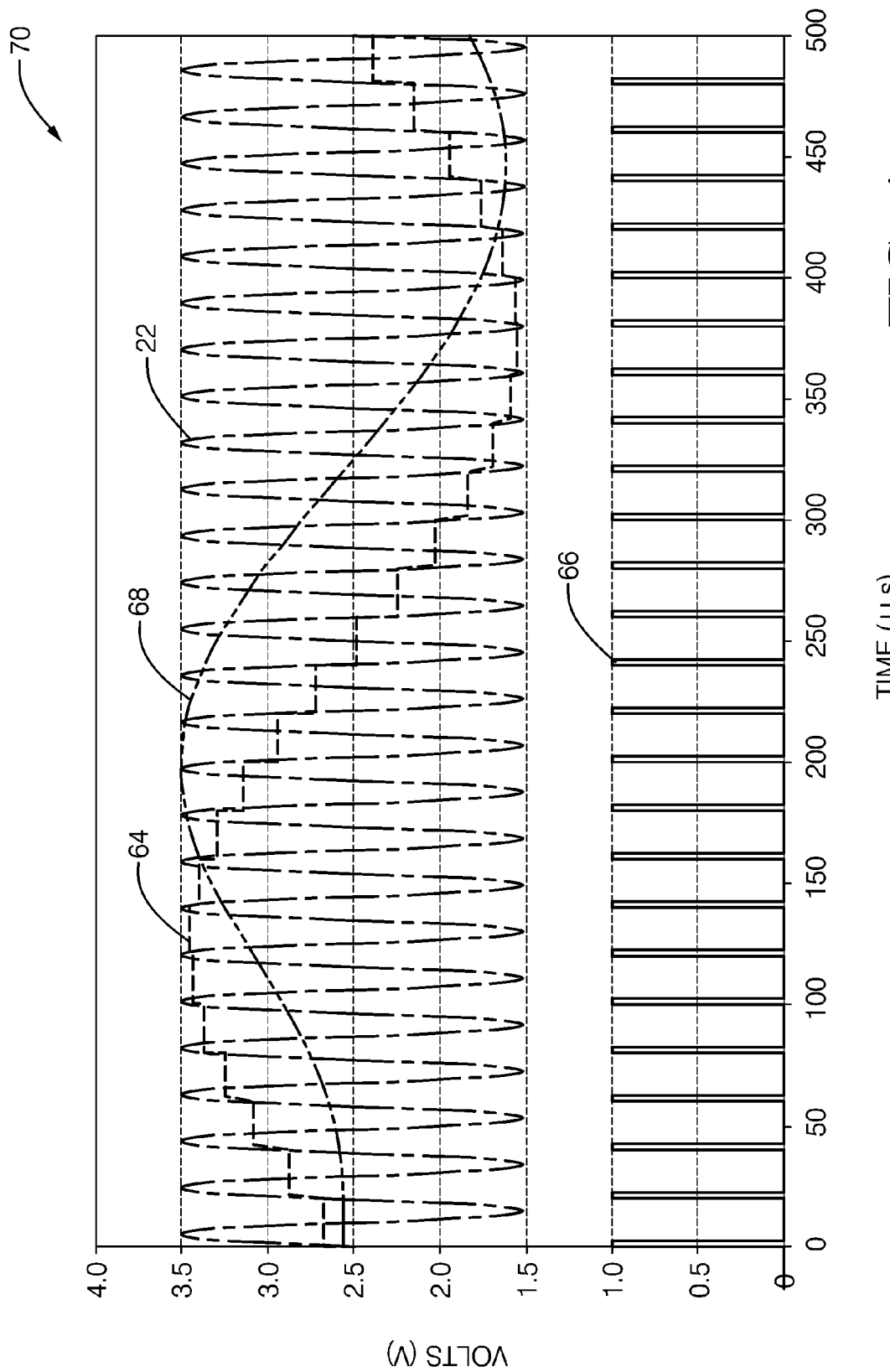
FIG. 4 is a graph of an exemplary signal occurring in FIGS. 1 and 3.

FIG. 4 shows a graph 70 of an exemplary electrode signal 22 arising from an excitation signal 30 having an excitation frequency of 52 kHz. The controller 24 may include a biasing network (not shown) coupled to the first terminal VO to bias the electrode signal to be centered at about 2.5 Volts as suggested in the graph 70. In this example, the sampling signal 66 has a frequency of 50 kHz. The scaling of the sampling signal 66 on the graph 70 indicates a logic level of either zero (0) or one (1) for the sampling signal 66. Accordingly, a stair-step like sub-sampled electrode signal 64 is formed by a series of electrode signal hold values corresponding to value of the electrode signal 22 at each falling edge of the sampling signal 66. If the sub-sampled electrode signal 64 is then filtered to smooth the stair step characteristics such that a filtered signal 68 may have a fundamental frequency of 2 kHz.

As used herein, sub-sampling means sampling the electrode signal 22 at a sampling frequency that is less than what is necessary to determine the electrode signal magnitude to a desired degree of accuracy during a single period of the electrode signal 22. By way of an example, if a sinusoidal signal is sampled at a sampling frequency that is ten (10) times the sinusoidal frequency, then the worst case error for determining the sinusoidal signal magnitude would occur when a sample is taken eighteen (18) phase degrees before the peak of the sinusoidal signal, and the next sample is taken eighteen (18) phase degrees after the peak of the sinusoidal signal. The worst case error can be estimated using the trigonometric sine of ninety minus eighteen degrees (sin(90−18) =0.951) and so a worst case error of about 5% is calculated. If the sampling frequency is increased, the worst case error decreases accordingly. Sub-sampling combines using a sampling frequency that is lower than necessary to assure the desired accuracy, with spreading the sampling over several cycles of the sinusoidal signal to decrease the worst case error. It should be appreciated that the sampling frequency selected may not be a harmonic or sub-harmonic of the sinusoidal signal and so has a varying phase difference with respect to the excitation signal. When the sampling frequency is selected to have a varying phase difference with respect to the excitation signal, the falling edges of sampling signal 66 shift with respect to the phase of the electrode signal 22 as time passes. The effect may be described as the phase of the electrode signal 22 corresponding to the electrode signal hold values shifting along the electrode signal 22, or phase walking up or down the waveform of the electrode signal 22 to allow the peak value of the electrode signal 22 to be sampled and held as illustrated.

As is illustrated in the graph 70, the sampling rate is sub-sampling the electrode signal 22 such that the minimum peak value of 1.5 and the maximum peak value of 3.5 may not be accurately determined during the few cycles of the electrode signal 22 shown. It isn't until about the seventh or eighth maximum peak of the electrode signal 22 that the sample and hold means 58 samples and holds an electrode signal hold value accurately indicates that the electrode signal 22 has a maximum peak value of 3.5 If the sampling continues, the varying phase difference causes the sampling signal 66 to eventually align with a minimum peak value of 1.5 at about 380 microseconds. The varying phase difference between the excitation signal 30 and the sampling signal 66 is such that an electrode signal value of the electrode signal 22 is eventually sampled that accurately represents the peak values of the electrode signal 22. It is understood that it is acceptable for the occupant detection system 10 to take up to 0.2 seconds to accurately determine an occupancy state, and so data sampling and processing can be spread out over may cycles of a 52 kHz excitation signal 30. As such, a sub-sampled electrode signal magnitude may be indicative of the electrode signal magnitude, and so the occupancy state may be detected based on the sub-sampled electrode signal magnitude.

Referring again to FIG. 3, in another embodiment the controller 24 may include a filter 67 receiving the sub-sampled electrode signal 64 and outputting a filtered signal 68. The filter 24 may be configured to reduce a fold-over signal having a fold-over frequency based on the sample rate and the excitation frequency. Such a filter may be called a low-pass filter or an anti-aliasing filter. Generally, digitally sampled systems have a foldover frequency corresponding to half of the electrode signal sampling frequency. By way of an example corresponding to the FIG. 4, a system using a sampling rate of 50 kHz has a foldover frequency of 25 kHz. If the excitation signal is 52 kHz as described above, the first foldover signal occurs at 73 kHz. In order to prevent higher frequency noise from affecting subsequent signal processing, it is necessary to reduce such foldover signals. Preferably, the filter 67 has a sufficiently sharp roll-off to ensure that the higher frequency foldover signals are attenuated by at least 40 dB. For the example above, a sufficient filter may be a 5th order elliptical filter with a cutoff frequency of 56.5 kHz. As another non-limiting example, the filer 67 may be a 60 dB/decade Low Pass Filter (LPF) having a corner frequency of about 10 kHz. Such a LPF may effectively smooth the stair step characteristics of signal 64 and effectively reduce the fold-over signal of the sub-sampled electrode signal 64 describe above.

One embodiment of controller 24 may include an analog to digital converter (ADC) 54 connected to the filter 67 to receive the filtered signal 68. Alternately, if no filter 58 is provided, the ADC 54 may be connected directly to the output of the sample and hold means 58. The sub-sampled electrode signal 64, or the filtered signal 68, has a sub-sampled electrode signal frequency based on the excitation frequency 30 and the sampling frequency that may be based on the sampling signal 66. The ADC 54 may be configured to output a series of signal values at an ADC clock frequency sufficient for the signal values to indicate the sub-sampled signal magnitude. The ADC 54 may be configured to capture samples of the filtered signal 68 at a clock frequency determined by a sampling signal 60, and output an ADC output signal 62 that comprises a series of filtered signal values corresponding to the filtered signal 68. As described above, the degree of accuracy expected from the ADC output signal 62 is based on the clock frequency. However, for the occupant detection system 10, the speed at which output data is produced is not as critical, and so a system and method that sub-samples the electrode signal 22 to spread the data sampling and data processing over a period of time may provide a system and method that can employ a lower cost conventional microprocessor that does not have specialized hardware directed toward digital signal processing or the processing speed available from higher cost microprocessors. It will be appreciated that microprocessors that supply a clock signal for a signal generator 52 and the ADC 54 built in, or are able to readily control such devices are commercially available. A signal generator 52 outputting a sinusoidal excitation signal 30 base on a clock signal from the processor 50 may include a network of analog circuitry to generate a sinusoidal signal from a clock signal. Such analog circuitry is known to those skilled in the art.

As such, determining the magnitude of the ADC output signal 62 may be useful to determine the presence of an occupant 12. As used herein, the magnitude of the ADC output signal 62, or the magnitude of the electrode signal 22 (electrode signal magnitude), or the magnitude of any other signal, refers to the amount of variation in the signal (i.e.— AC portion of the signal), which is measurement based on data collected over a period of time. The magnitude of a signal should not be confused with the absolute value of a signal at a particular time. In one embodiment, the magnitude of the ADC output signal 62 may correspond to a difference between a maximum peak value and a minimum peak value, also known as a peak-to-peak magnitude. Such a value is readily determined by searching the values in the ADC output signal 62 for a maximum and minimum value. In FIG. 4 these values would occur at about 200 us and at about 450 us. The determination of an occupancy state base on the magnitude of ADC output signal 62 may be by way of a look-up table or one or more equations.

Figure 5:
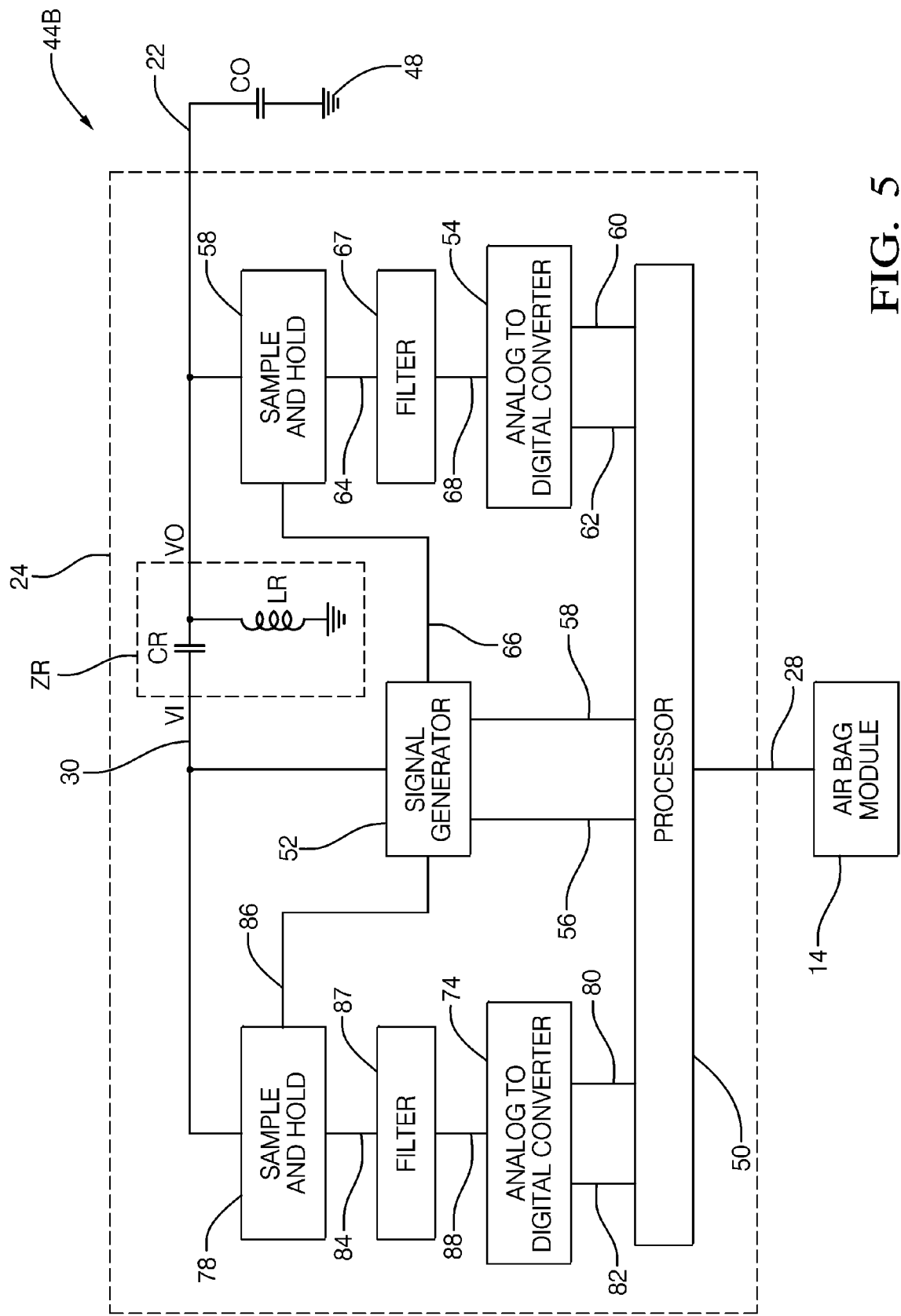
FIG. 5 is a block/circuit diagram illustrating an embodiment the occupant detection system shown in FIG. 1.

FIG. 5 illustrates another exemplary embodiment of a circuit diagram 44B showing another embodiment of the controller 24 with additional features as compared to FIG. 3. The illustration of the occupant 12 residing in the seat assembly 32 that includes the electrode 20 in FIG. 3 is replaced in FIG. 5 by a corresponding capacitor CO. The signal generator 52 includes a second sampling signal output configured to output a second sampling signal 86 having a second sampling frequency that may be based on the excitation frequency. The controller 24 includes a second sample and hold means 78 configured to sample the excitation signal 30 at the second sampling frequency to generate a sub-sampled excitation signal 84 having a sub-sampled excitation signal frequency based on the excitation frequency and the second sampling frequency. The sub-sampled excitation signal 84 has a sub-sampled excitation signal magnitude indicative of the excitation signal magnitude, whereby the occupant detection is based on the sub-sampled electrode signal magnitude relative to the sub-sampled excitation signal magnitude. Such an arrangement is advantageous in that the magnitude of the excitation signal 30 may be directly measured and so the voltage divider ratio of the detection network may be more accurately determined, as opposed to assuming that the actual excitation signal magnitude was substantially equal to the expected excitation signal magnitude based on the generator control signal 56. FIG. 5 also illustrates a filter 87 outputting a filtered signal 88 into an ADC 74 that is controlled by a sampling signal 80 to output an ADC output signal 82, all of which correspond in function to the sample and hold means 58, filter 67, and ADC 54 coupled to the electrode signal 22. The filter 87 may have similar filtering characteristics as those described above with regard to filter 67 in FIG. 3.

In one embodiment, the sampling signal 66 sampling frequency and the second sampling signal 86 second sampling frequency are equal and the phase of the sampling signal and the phase of the second sampling frequency are different. Under this condition, the phase difference between the sampling signal 66 and the second sampling signal 86 may be adjusted so that the phases of the filtered signal 68 and the filtered signal 88 are substantially in phase so that the electrode signal 22 and the excitation signal may be more readily compared.

Figure 6:
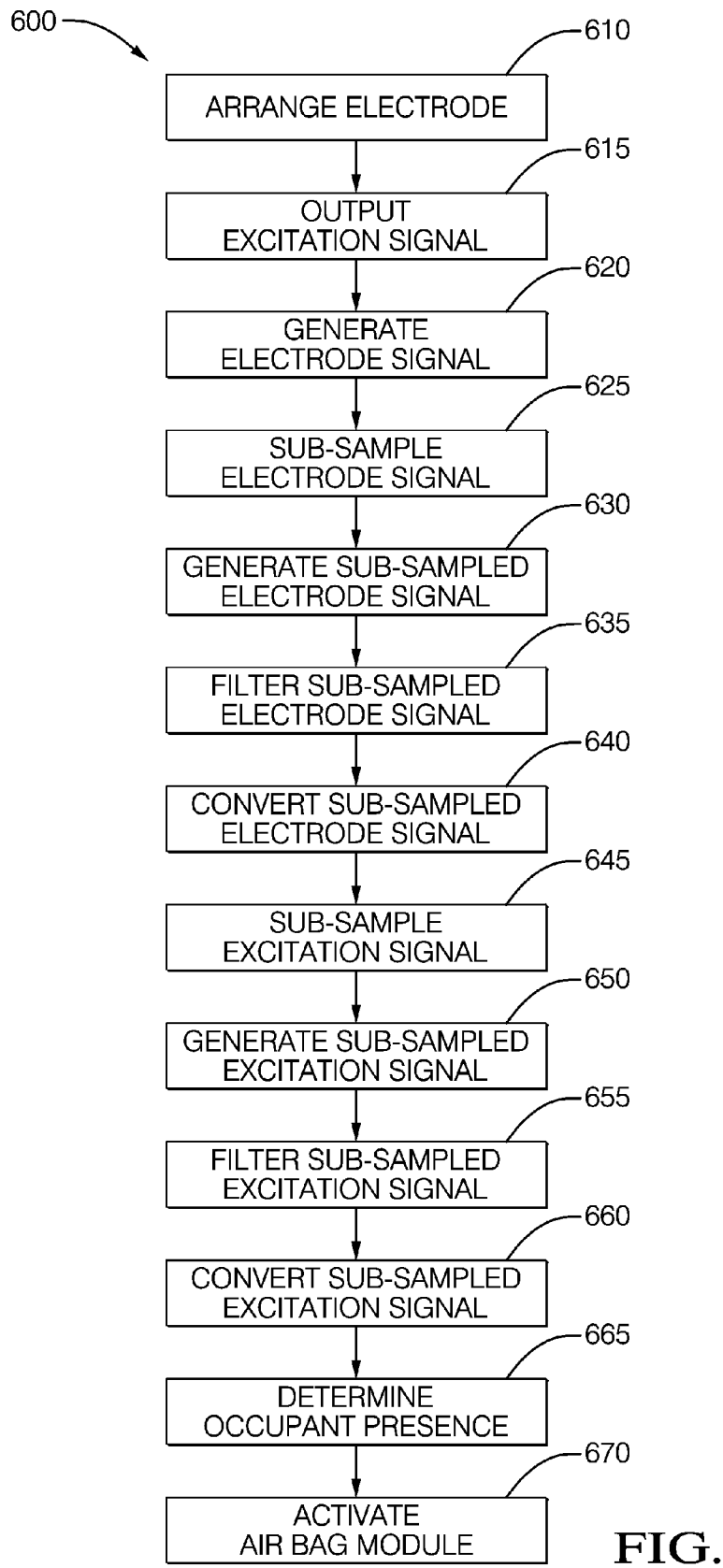
FIG. 6 is a flow chart illustrating a method to determine presence of an occupant residing in the seat assembly shown in FIG. 2.

FIG. 6 illustrates an embodiment of a method or routine 600 for detecting an object at a location, for example, a vehicle occupant 12 in a vehicle seat assembly 32. The method is generally directed at sub-sampling an electrode signal 22 arising in response to an electrode signal 30 to determine the presence of an occupant 12. At step 610, an electrode 20 is arranged proximate to an expected location of an object or an occupant 12 for sensing an occupancy state proximate thereto. Such arranging may include arranging conductive material in a seat bottom, seat back, or other location on or about a seat assembly 32 that is near the expected location of an the occupant 12. The arrangement is such that the electrode 20 exhibits an electrode impedance that may be indicative of an occupancy state. At step 615, outputting an excitation signal 30 to the electrode 20 may include providing a signal generator 52 and operating the signal generator 52 to output the excitation signal 30. The excitation signal 30 may be characterized as having an excitation magnitude indicative of the amplitude of the excitation signal 30, and an excitation frequency selected based on the electrode impedance. The excitation signal 30 may be coupled to the electrode 20 by way of a reference impedance device ZR to forms a detection network, whereby the electrode signal 22 may have signal characteristics such as magnitude or phase that may be dependent upon the impedance of the reference impedance device ZR, and the electrode impedance.

At step 620, the detection network formed by a reference impedance device ZR and the electrode 20 may generate an electrode signal 22 in response to the excitation signal 30. The electrode signal 22 may be characterized as having an electrode frequency corresponding to or equal to the excitation frequency, and as having an electrode signal magnitude indicative of an occupancy state. At step 625, a sample and hold means 58 may sub-sample the electrode signal 22 at a sampling frequency. The sampling frequency may be selected based on the excitation frequency. The sampling frequency is advantageously selected to have a varying phase difference with respect to the excitation signal. A varying phase difference means that the sampling frequency is not a harmonic or sub-harmonic of the excitation frequency such that the phases of the excitation signal and the sampling signal shift over time and are not consistently in-phase.

At step 630, the sample and hold means 58 generates a sub-sampled electrode signal 64 having a sub-sampled electrode signal magnitude indicative of an occupancy state and a sub-sampled electrode fundamental frequency and frequency spectrum based on an interaction of the electrode signal 22 and the sampling signal 66. At step 635, the sub-sampled electrode signal 64 may be filtered by filter 67 to reduce a fold-over signal by an effective amount, such as 40 dB. The filtering may be performed by a network of electrical components arranged to form an analog type filter, or may be performed by a digital filter. The fold-over signal includes a fold-over frequency based on the sampling frequency and the excitation frequency.

At step 640, an analog-to-digital converter (ADC) converts the sub-sampled electrode signal into a series of ADC output values, wherein the ADC is clocked at a clock frequency sufficient for the ADC output values to provide an indication of the sub-sampled electrode signal magnitude. It will be appreciated that the ADC clock frequency can be increased to increase the accuracy of determining the sub-sampled electrode signal magnitude, and that increasing the number of ADC output values examined to determine the sub-sampled electrode signal magnitude may also be increased to increase accuracy. After step 640 is completed, the occupancy state may be determined according to step 665 based on an assumed value for the excitation magnitude. However, by determining the excitation magnitude as described in the following, the accuracy of determining the presence of an occupant may be increased.

At step 645, a sample and hold means 78 sub-samples the excitation signal in a manner similar to step 625, and at a second sampling frequency. The second sampling frequency selected may be based on the excitation frequency. At step 650, the sample and hold means 78 generates a sub-sampled excitation signal having a sub-sampled excitation signal magnitude. At step 655, a filter 87 filters the sub-sampled excitation signal 84 to reduce a fold-over signal and other harmonics generated by the sample and hold means 78. At step 660, an ADC 74 converts the sub-sampled excitation signal into a series of analog-to-digital converter (ADC) output values according to a sampling signal 80 to output an ADC output signal 82, wherein the ADC is clocked at a clock frequency sufficient for the ADC output values to provide an indication of the sub-sampled excitation signal magnitude.

At step 665, the processor 50 determines an occupancy state based on a determination of the sub-sampled electrode signal magnitude with respect to the sub-sampled excitation signal magnitude. Alternately, the occupancy state may be determined base on an assumed excitation signal magnitude instead of an actual excitation signal magnitude available from ADC output signal 82. At step 670, the processor 50 may activate an air bag module 14 based on determining the occupancy state. The decision to activate the air bag module 14 may be based on a formula or a look-up table stored in processor 50.

Accordingly, an occupant detection system 10, a controller 24 for the occupant detection system 10, and a method 600 of detecting an occupant 12 using sub-sampling is provided. Sub-sampling is a way to determine the magnitude of high frequency signals while avoiding the increased hardware expense normally associated with high-speed signal processing. As such, sub-sampling provides an improvement over other known means in that the data processing of the electrode signal, may be accomplished using a lower cost conventional microprocessor, as opposed to a higher cost digital signal processor or a high-speed microprocessor. Sub-sampling is particularly well suited for use in systems such as an occupant detection system where sampling data for up to a second may be acceptable. In particular, the electrode signal 22 is sampled at a relatively slow rate considering the desired accuracy, but the sampling persists over a plurality of periods of the excitation signal and has a varying phase difference with the excitation signal so that the desired accuracy may be obtained. Contrariwise, some systems that need to quickly analyze an incoming signal for a characteristic such as signal magnitude, and cannot afford to wait for the low cost electronics to finish the signal analysis may not be able to use sub-sampling advantageously.

While this invention has been described in terms of the preferred embodiments thereof, it is not intended to be so limited, but rather only to the extent set forth in the claims that follow.

I claim:

1. An object detection system comprising:
    an electrode arranged proximate to a location to sense a presence of an object at the location, said electrode exhibiting an electrode impedance indicative of the presence of an object;
    a reference impedance device coupled to the electrode to form a detection network;
    a signal generator comprising an excitation signal output coupled to the detection network, said excitation signal output configured to output an excitation signal having an excitation frequency to generate an electrode signal on the detection network having an electrode signal magnitude indicative of the presence of an object; and
    a sample and hold means configured to sub-sample the electrode signal at a sampling frequency and generate a sub-sampled electrode signal having a sub-sampled electrode signal magnitude indicative of the electrode signal magnitude, whereby an occupancy state is determined based on the sub-sampled electrode signal magnitude.

2. The system in accordance with claim 1, wherein said system is arranged in a vehicle, said electrode is arranged adjacent a seating surface of a vehicle seat to sense if an object is occupying the vehicle seat based on the sub-sampled electrode signal magnitude, and said occupancy state includes an empty seat state and an occupant present state.

3. The system in accordance with claim 2, wherein said system further comprises an air bag module that receives an activation signal based on the determined occupancy state.

4. The system in accordance with claim 1, wherein said reference impedance device is interposed between the electrode and the signal generator, wherein said reference impedance device comprises a first terminal coupled to the electrode and a second terminal coupled to the signal generator.

5. The system in accordance with claim 4, wherein said reference impedance device comprises a capacitor interposed between the first terminal and the second terminal, whereby the detection network exhibits a voltage division characteristic indicative of the occupancy state.

6. The system in accordance with claim 4, wherein said reference impedance device further comprises an inductor connected to the second terminal, whereby the detection network exhibits a voltage division characteristic having a resonant frequency indicative of the occupancy state.

7. The system in accordance with claim 1, wherein said signal generator further comprises a sampling signal output configured to output a sampling signal to the sample and hold means to determine the sampling frequency of the sample and hold means.

8. The system in accordance with claim 1, wherein the sampling frequency is selected to have a varying phase difference with respect to the excitation signal.

9. The system in accordance with claim 1, wherein said system further comprises a filter configured to reduce by an effective amount harmonics of the excitation signal, harmonics of the sampling signal, and a fold-over signal having a fold-over frequency based on the sampling frequency and the excitation frequency.

10. The system in accordance with claim 1, wherein said system further comprises an analog-to-digital converter (ADC) configured to output a series of signal values at an ADC clock frequency sufficient for the signal values to indicate the sub-sampled signal magnitude.

11. The system in accordance with claim 1, wherein said signal generator further comprises a second sampling signal output configured to output a second sampling signal having a second sampling frequency base on the excitation frequency, said system further comprising a second sample and hold means configured to sample the excitation signal at the second sampling frequency to generate a sub-sampled excitation signal having a sub-sampled excitation signal frequency based on the excitation frequency and the second sampling frequency, and having a sub-sampled excitation signal magnitude indicative of the excitation signal magnitude, whereby the occupant detection is based on the sub-sampled electrode signal magnitude relative to the sub-sampled excitation signal magnitude.

12. The system in accordance with claim 11, wherein the sampling frequency and the second sampling frequency are equal and the phase of the sampling signal and the phase of the second sampling frequency are different.

13. A controller for use in a vehicle occupant detection system having an electrode coupled to the controller, wherein the electrode is arranged proximate to an expected location of an occupant for sensing an occupancy state proximate thereto and exhibiting an electrode impedance indicative of an occupancy state, said controller comprising:
a reference impedance device coupled to the electrode to form a detection network;
a signal generator comprising an excitation signal output coupled to the detection network, said excitation signal output configured to output an excitation signal having an excitation frequency to generate an electrode signal on the detection network having an electrode signal magnitude indicative of the occupancy state; and
a sample and hold means configured to sample the electrode signal at a sampling frequency and generate a sub-sampled electrode signal having a sub-sampled electrode signal magnitude indicative of the electrode signal magnitude, whereby the occupancy state is detected based on the sub-sampled electrode signal magnitude.

14. A method for detecting an object at a location comprising the steps of:
arranging an electrode proximate to the location to sense a presence of an object at the location, said electrode exhibiting an electrode impedance indicative of the presence of an object;
outputting an excitation signal that is coupled to the electrode, said excitation signal having an excitation frequency selected based on the electrode impedance;
generating an electrode signal in response to the excitation signal, said electrode signal having an electrode signal magnitude indicative of the presence of an object;
sub-sampling the electrode signal at a sampling frequency, said sampling frequency selected based on the excitation frequency;
generating a sub-sampled electrode signal having a sub-sampled electrode signal magnitude indicative of the presence of an object; and
determining an occupancy state based on the sub-sampled electrode signal magnitude indicating that an object is present at the location.

15. The method in accordance with claim 14, wherein the location is a vehicle seat, the step of arranging the electrode includes arranging the electrode adjacent a seating surface of the vehicle seat to sense if an object is occupying the vehicle seat; and the step of determining an occupancy state includes determining an empty seat state and an occupant present state.

16. The method in accordance with claim 15, said method further comprising the step of;
determining the activation status of an air bag module based on the step of determining the occupancy state.

17. The method in accordance with claim 14, wherein the excitation signal comprises a plurality of frequencies, the electrode signal magnitude exhibits a frequency response characteristic having a resonant frequency indicative of the occupancy state, the sub-sampled electrode signal magnitude is indicative of the resonant frequency, and the step of determining an occupancy state is based on determining the resonant frequency.

18. The method in accordance with claim 14, wherein the sampling frequency is selected to have a varying phase difference with respect to the excitation signal.

19. The method in accordance with claim 14, said method further comprising the step of:
converting the sub-sampled electrode signal into a series of analog-to-digital converter (ADC) output values, wherein the ADC is clocked at a clock frequency sufficient for the ADC output values to provide an indication of the sub-sampled electrode signal magnitude.

20. The method in accordance with claim 14, said method further comprising the steps of:
sub-sampling the excitation signal at a second sampling frequency, said second sampling frequency selected based on the excitation frequency;
generating a sub-sampled excitation signal having a sub-sampled excitation signal magnitude; and
determining an occupancy state based on a determination of the sub-sampled electrode signal magnitude with respect to the sub-sampled excitation signal magnitude.

21. The system in accordance with claim 1, wherein the sampling frequency is less than the excitation signal.

22. The controller in accordance with claim 13, wherein the sampling frequency is less than the excitation signal.

23. The method in accordance with claim 14, wherein the sampling frequency is less than the excitation signal.

* * * * *